UNITED STATES PATENT OFFICE.

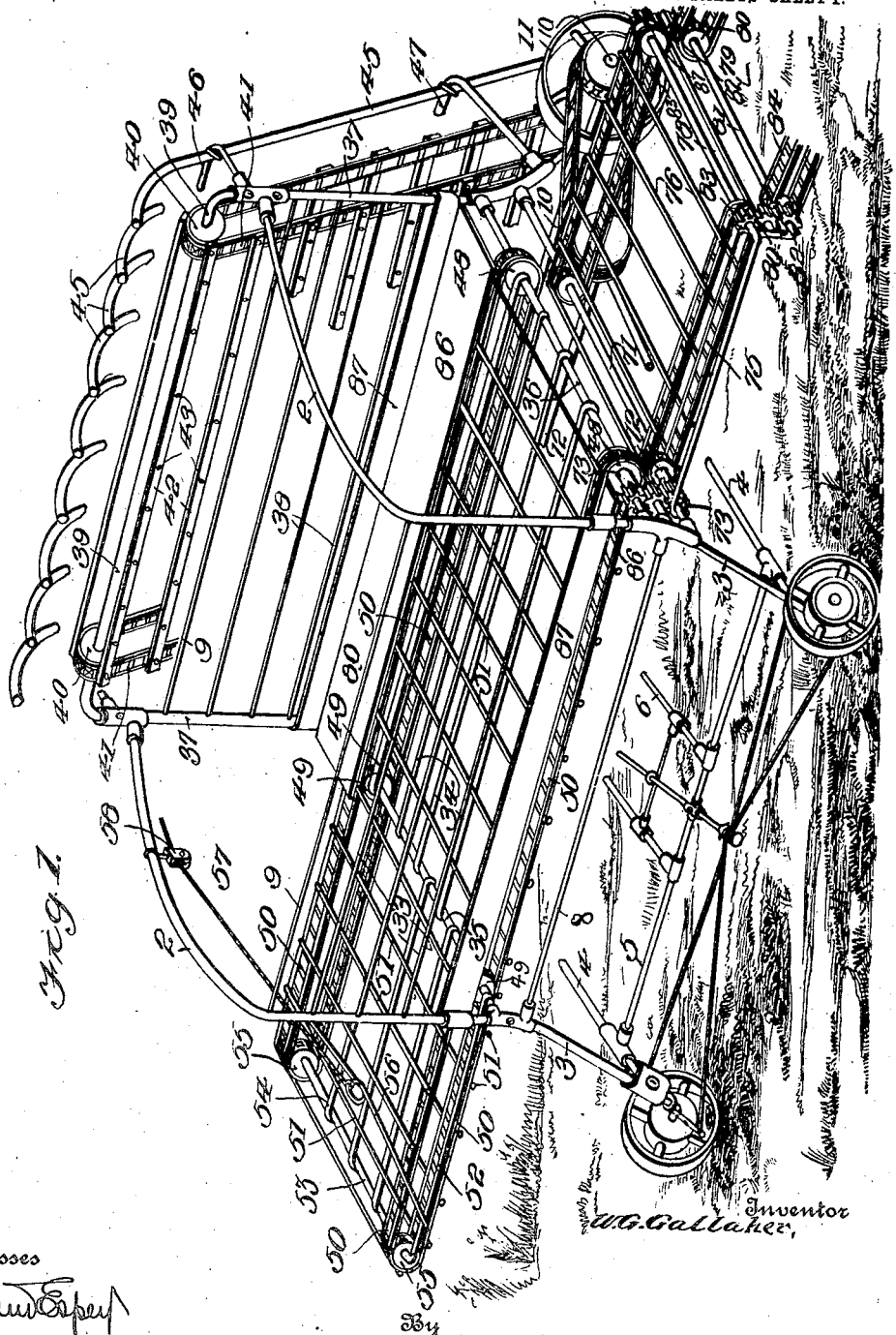

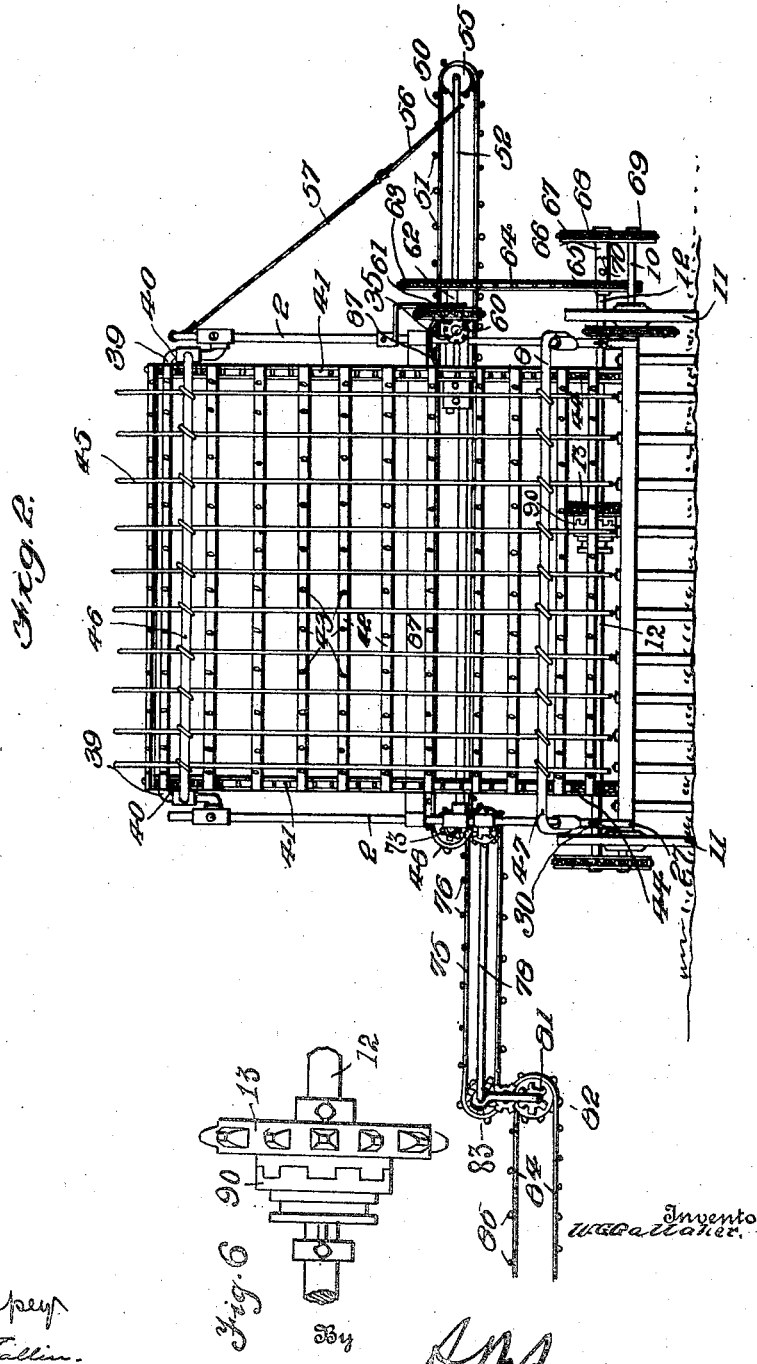

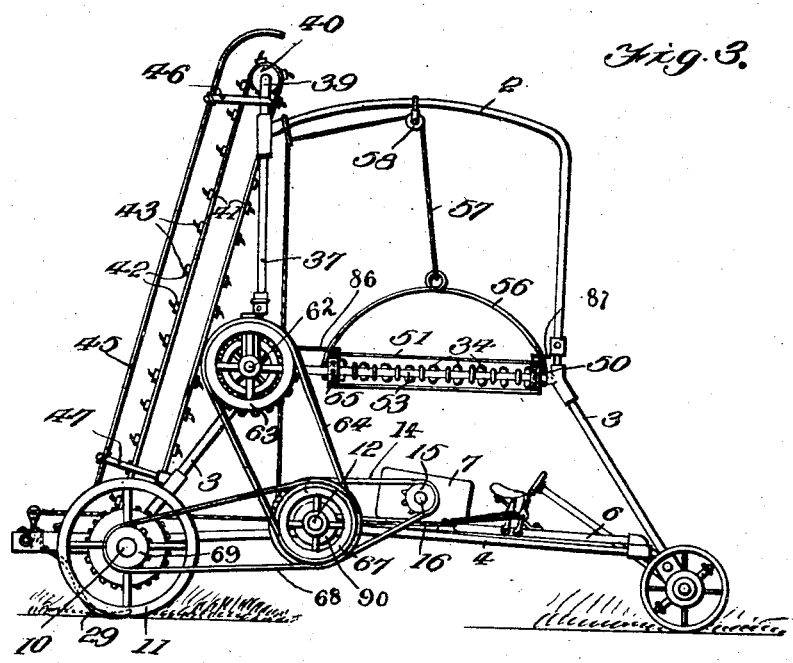

WALLACE G. GALLAHER, OF SALIDA, COLORADO.

HAY GATHERING AND STACKING MACHINE.

1,109,674.   Specification of Letters Patent.   Patented Sept. 8, 1914.

Application filed November 9, 1911. Serial No. 659,376.

*To all whom it may concern:*

Be it known that I, WALLACE G. GALLAHER, a citizen of the United States, residing at Salida, in the county of Chaffee and State of Colorado, have invented certain new and useful Improvements in Hay Gathering and Stacking Machines, of which the following is a specification.

My invention relates to agricultural machines, and particularly to machines for gathering and stacking hay.

The primary object of the invention is to provide a mechanism of the character above referred to including a hay rack so constructed that it may be used for receiving hay in the field and conveying it from the field and then used to stack the hay or discharge it from the rack.

A further object of the invention is to provide means whereby the hay may be discharged from either end of the rack.

A further object is to provide conveying means in connection with a machine of this character, which means are adjustable so that the hay may be either raised to a higher level than the rake or lowered to a lower level than the rake.

A further object is to provide means whereby the rake and the conveyer mechanism thereon may be used as a means of transferring hay from one stack to another stack.

Other objects will appear in the course of the following description.

An embodiment of my invention is illustrated in the accompanying drawings wherein:

Figure 1 is a perspective view of the machine, the motor, however, not being shown. Fig. 2 is a rear elevation of the machine. Fig. 3 is a side elevation thereof. Fig. 4 is a detail sectional view of one end of the main conveyer and the coacting auxiliary conveyer showing the gearing whereby the auxiliary conveyer is driven from the main conveyer. Fig. 5 is a detail fragmentary elevation of one end of the main frame forming the bottom of the rack, a portion of the conveyer sprocket chains, and particularly showing the means whereby the upper flight of the sprocket chain is held in engagement with the sprocket wheel. Fig. 6 is an enlarged detail of the clutch device.

Corresponding and like parts are referred to in the following description and indicated in all the views of the accompanying drawings by the same reference characters.

The frame of the machine comprises the end frames 2 which are essentially duplicates of each other. These end frames as illustrated in Fig. 3 are wider at their lower ends than at their upper ends so as to provide a wide wheel base for the machine. Preferably, and as illustrated, the end frames each consist of a metal bar or rod having the form of an inverted U, the ends of the legs of the U-shaped bar being outwardly diverged as at 3.

Connecting the lower ends of the legs of each end frame is a brace bar 4 which is preferably bent as illustrated in Fig. 3, and connecting the lower ends of the legs of one end frame with the lower ends of the legs 3 of the other opposed end frame are the transverse brace bars or rods 5 which are connected in any suitable manner to the brace rods 4. Supported upon these brace rods are supporting rods or bars 6 which extend from front to rear of the machine and are preferably located near the middle of the machine for the purpose of supporting a platform upon which the motor 7 is mounted. The end frames are also connected to each other by transverse bars 8 which are disposed at the points where the legs 3 are bent outward from the main body of the end frames. The upper ends of the frames 2 are also connected to each other by means of the transverse brace bars 9. It will of course be understood that the frame may be formed in any desired manner and that I do not wish to limit myself to the particular manner of bracing or connecting these frames illustrated in the drawing.

Mounted upon the rear ends of the bars 4 in any suitable manner is the transverse shaft 10 having upon it at opposite ends the traction wheels 11. Mounted upon the frame bars 4 and 6 in any suitable manner is the driving shaft 12 which carries thereon a sprocket wheel 13 over which passes a sprocket chain 14, which in turn is driven by a sprocket wheel 15 on the motor shaft 16. Means are provided whereby the sprocket wheel 13 on the shaft 12 may be thrown into and out of gear with the motor shaft. An ordinary clutch represented conventionally at 90 whereby the loose sprocket wheel 13 may be thrown into and out of engagement with the shaft 12 may be used for this purpose, as shown in Fig. 4. Carried upon opposite ends of the shaft 12 are the sprocket wheels 17, and mounted upon the shaft 10 are the sprocket wheels 18 to which power is delivered from the driving shaft 12 by means of the sprocket chains 19. Thus power is transmitted to the traction wheels for the purpose of moving the machine over the ground. The forward end of the machine is supported by means of caster wheels 20 which are suitably connected to the frame. A suitable steering mechanism will be connected in any suitable manner upon the frame. I, of course, do not desire to limit myself to any specific steering mechanism as it is obvious that a number of devices might be arranged to this end. I do not, therefore, desire to limit myself to the exact manner of operating the traction wheels 11 from the driving shaft 12, as means other than the sprocket wheels and the chain 19 might be used for this purpose.

A suitable rake, traction, and steering mechanism may be used in connection with the rake and rack.

The upper portion of my machine above the motor and above the driver's seat is arranged to provide a rack for the hay which may be gathered up by the rake device. To this end the vertical portions of the end bars 2 are connected at front and rear by means of transverse rods, wires or like members designated 33, these wires, rods or bars forming slats which are placed sufficiently close together to form a rack and retain the hay within the upper portion of the machine.

The floor of the rack is formed by bars, rods, slats or like members designated 34 and extending transversely from one end of the rack to the other and spaced apart a sufficient distance to prevent hay from dropping down upon the operator. The ends of these bars 34 are connected to the forwardly and rearwardly extending shafts 35 and 36 which are connected to the downwardly extending portions of the end frames in any suitable manner, as will be seen from Fig. 1. The shaft 35 is fixed, while the shaft 36 rotates. The rear side of the rack is formed by upwardly extending bars 37 which form the rear vertical bars of the frames 2. Across the space between the upright bars 37 are placed the transverse rods, bars, slats, wires or like members 38 which assist in forming the rack and which prevent the hay from tumbling out the rear end of the rack. It will be seen that this arrangement provides a rack having sufficient depth to hold a large quantity of hay, and this without increasing the length of the wheel base.

For the purpose of raising the hay gathered by the rake teeth 29 and elevating this hay to a position where it may be dumped into the upper end of the rack, I provide an endless elevator which is located at the rear end of the machine and is driven by suitable gearing from the driving shaft. This endless elevator consists of two parallel sprocket chains or flights passing over sprocket wheels, these chains being connected by transverse bars having projecting hay-engaging pins thereon. As illustrated, an upper, transversely extending, fixed shaft 39 which forms part of the frame of the machine carries upon it the sprocket rollers or wheels 40 over which pass the sprocket chains 41. These oppositely disposed sprocket chains are connected by slats 42 having hay engaging pins 43 extending out therefrom.

Mounted upon the driven shaft 10 are the sprocket wheels 44 under which the sprocket chains 41 pass. Thus as the shaft 10 is rotated the endless elevator will be caused to carry upward the hay gathered by the rakes and deposit the same in the rack. For the purpose of holding the hay to the elevator in the upward movement of the elevator, I provide the guide bars 45 which are outwardly turned at their lower ends and which are inwardly turned at their upper ends. The bars 45 are spaced from the face of the elevator or conveyer, and the upper ends of the bars extend over the upper end of the elevator as shown in Fig. 3 and extend slightly over the upper end of the rack. There are as many of these vertical guide bars as desired and the bars are supported by means of upper and lower transverse supporting bars 46 and 47 to which the vertical guide bars 45 are attached in any suitable manner.

Mounted upon the shaft 36 are the sprocket rolls or wheels 48, and mounted upon the rotatable shaft 35 are the sprocket wheels or rollers 49. Passing over these sprocket wheels is an endless conveyer formed of the lateral sprocket chains 50 which are connected by the transverse slats 51. Rotatably mounted upon the shaft 35 is a rectangular frame formed by the longitudinal bars 52 and a transverse bar 53, this bar 53 being connected to the shaft 35 by longitudinal wires, rods or like members 54. It will be seen that this frame formed by the members 52 and 53 is rotatable upon the shaft 35 and may be raised or lowered and practically forms a continuation of the frame forming the floor of the rack.

The transverse member 53 forms a fixed shaft upon which are mounted the rotatable sprocket wheels 55 over which the sprocket chains 50 pass. It will be seen that when this frame or extension of the main floor of the rack is turned downward, the upper flight of the sprocket chains 50 will be drawn against the driving sprocket rollers 49 on the shaft 35, and that when the extension formed by the members 52 and 53 is raised, the lower flight of the endless conveyer will be drawn against the rollers 49. Thus no matter whether the extension of the floor is upwardly inclined or downwardly inclined, the endless conveyer will be taut and be held in positive engagement with the driving sprocket wheels 49. Any suitable means may be used for raising or lowering the extension and as a means to this end I have shown a yoke 56 attached to the side bars 52 and having a flexible connection 57 which runs over a pulley 58 and is then connected to the frame in any suitable manner so that the flexible connection may be shortened or lengthened to thus raise or lower the extension of the conveyer frame.

For the purpose of driving the sprocket chains 50, I provide the shaft 35 with a gear wheel 60 which is engaged by a bevel gear wheel 61 carried upon a short shaft 62. This shaft also carries upon it the sprocket wheel 63 over which passes a sprocket chain 64 which passes over a sprocket wheel 65 loosely mounted upon the shaft 12. Also loosely mounted upon the shaft 12 is a sleeve 66 carrying a sprocket wheel 67 over which passes a sprocket chain 68 which is driven from a sprocket wheel 69 on the shaft 10.

The sleeve upon which the wheel 65 is mounted is provided with clutch teeth 70 adapted to engage the clutch teeth on the sleeve 66, and by shifting the sleeve 65 into and out of engagement with the sleeve 66, the conveyer mechanism may be driven or left stationary as desired. Under ordinary circumstances and when hay is gathered, the conveyer will of course be stationary, but when it is desired to dump the hay, the conveyer is placed in engagement with the driving gear and operated. I of course do not wish to limit myself to any specific arrangement for driving this conveyer. I have shown for this purpose a train of gearing which I believe to be thoroughly effective, but it will be perfectly obvious that other gearing might be substituted without departing from the spirit of the invention.

It is oftentimes desirable to provide means for stacking hay or lifting hay to a higher elevation than is possible by means of the rack of the auxiliary conveyer formed by the chains 50 and slats 51. For this purpose I provide the opposite end of the rack with a double auxiliary conveyer illustrated on the right hand end of Fig. 1. As a means to this end I mount upon the end frame opposite to the shaft 35 a transversely extending fixed shaft 71 located slightly below the level of the shaft 36 carrying upon it the sprocket wheels 48. These sprocket wheels are mounted upon a sleeve 72 which carries a toothed gear 73. This gear 73 meshes with an idler toothed gear wheel 73', while the latter in turn engages a gear 74 carried upon the shaft 36. It will be seen that the rotation of the shaft 36 caused by the conveyer passing thereover will cause the rotation of the shaft 71 and a like movement of the conveyer operated by the sprocket wheel 72. This auxiliary conveyer, like the conveyer first described, consists of the oppositely disposed parallel sprocket chains 75 connected by transverse slats 76. These chains pass over idler rollers or sprocket wheels 77 mounted upon a shaft 78 which forms a part of the frame of the auxiliary conveyer.

As illustrated in the drawings, the ends of the fixed shaft 78 are bent at right angles and forward of the main frame so as to engage over fixed shaft 71. The conveyer frame just described is, of course, adapted to be turned up into such position as to close one end of the hay rack in the same manner as the conveyer at the other end, and therefore in order to secure a fuller length for the last described conveyer, it is best to add to it one or more sections. As illustrated in the drawings, one section 79 is added to the conveyer 75—76 and comprises a U-shaped frame hingedly mounted upon the shaft 78. This U-shaped shaft frame carries sprocket wheels 80 and has a countershaft 81 carrying upon it gear wheels 82 which engage through idlers 82' with gear wheels 83 mounted upon the shaft 78. The shaft 81 carries sprocket wheels 80 over which pass sprocket chains 84 with transverse slats 85.

In order to prevent the hay gathered in the hay rack from being carried out and falling from the front and rear of the conveyer forming the bottom of the rack, I preferably attach to the end frames 2 the angular guards 86 whose horizontally disposed flanges extend inward immediately over the conveyer which forms the bottom of the hay rack.

When the extension 52 of the hay rack is upwardly inclined, in order to stack the hay upon a stack which is higher than the level of the bottom of the rack, it is necessary to provide some means to prevent the upper stretches of the chains 51 from leaving the sprocket wheels 49, and to that end I mount in any suitable manner above each of the sprocket wheels 49 the bowed guides 87' which extend over the sprocket wheels, the extremities of the guides being depressed sufficiently so as to force the upper stretch of the sprocket chain into proper driving engagement with the sprocket wheel 49 as illustrated in Fig. 4.

The operation of my invention will be evident from what has gone before. The machine may either be drawn over the field by draft animals, or else propelled by its own power, preferably the latter. As the machine is propelled over the field, the hay will be gathered by the rake teeth 29. As the machine moves over the field, the elevator at the rear end thereof will raise the hay gathered by the rakes upward between the outer stretch of the elevator and the guide bars 45 and the hay will be dumped into the upper portion of the hay rack formed by the end pieces 2, the connecting rods 33 and 38 between the end pieces, and the lateral pivoted conveyer sections which are of course movable up in such position as to form ends to the hay rack. Of course when the machine is moving across a field for the purpose of gathering the hay and depositing it into the rack, the sprocket wheel 65 and the sprocket wheel 67 is shifted so that no power is transmitted to the conveyers. When the rack reaches the place where the hay is to be stacked, the driving traction wheels are disconnected from the driving shaft 12 and the sprocket wheel 67 is connected to the driving shaft, thus driving the shaft 62 and operating the horizontally disposed conveyers, thus carrying the hay out from the rack and depositing it upon the stack or in any desired place.

It is obvious that the frame formed by the bars 52 and the shaft 53 may be elevated to any desired inclination and may be gradually raised as the stack rises.

While I have shown what I believe to be the most effective form of my invention, I do not wish to be limited thereto as it is obvious that many changes might be made without departing from the spirit thereof.

What I claim is:

1. In a hay gathering machine of the character described, a main supporting frame, a hay rack mounted upon the frame and including an upwardly extending back and front, a conveyer pivotally mounted upon the main frame at one end thereof approximately at the level of the floor of the rack, a conveyer carried upon the main frame and the conveyer supporting frame and forming the floor of the rack and one end of the rack when the pivoted conveyer supporting frame is turned to a vertical position, means for driving the said conveyer, and means for disengaging the conveyer from the driving means.

2. In a hay gathering machine of the character described, a main supporting frame, a hay rack mounted upon the frame and open at its ends and including upwardly extending front and rear members, auxiliary frames pivotally mounted at the ends of the main frame each at a point approximately level with the floor of the hay rack, and endless conveyers mounted upon said auxiliary frames and extending across the floor of the rack, said auxiliary frames being movable into a vertical position to close the ends of the rack or into a horizontal position.

3. In a hay gathering machine of the character described, a main supporting frame, a hay rack mounted upon the frame including an upwardly extending back and an upwardly extending front, a conveyer supporting frame pivotally mounted upon the main frame at one end thereof approximately at the level of the floor of the rack, a conveyer carried upon the main frame and the conveyer supporting frame and forming the floor of the rack and one end of the rack when the pivoted conveyer supporting frame is turned to a vertical position but forming a continuation of the floor of the rack when the pivoted frame is turned to a horizontal position, a vertically disposed conveyer connected at one side of the rack and discharging there into driving means for operating said conveyers, and means for independently connecting either one of the conveyers to said driving means or disconnecting it therefrom.

4. In a hay gathering machine of the character described, a main supporting frame, a hay rack mounted upon the frame and including a vertically disposed back and a vertically disposed front, auxiliary conveyer supporting frames pivotally mounted upon the main frame each at a point approximately level with the floor of the rack and extending out on opposite sides thereof, said supporting frames being adapted to be turned up to form ends closing the ends of the hay rack, endless conveyers operating across the floor of the rack and extending over and carried by said auxiliary frames, means for operating the endless conveyers, and means for raising and lowering the endless conveyers at any desired angle.

5. In a gathering machine of the character described, main supporting frame, a hay rack mounted upon the frame and including vertically disposed back and a vertically disposed front, a conveyer supporting frame pivotally mounted upon the main frame at one end thereof approximately at the level of the floor of the rack, an endless conveyer carried upon the main frame and the conveyer supporting frame and forming the front of the rack and one end of the rack when the pivoted conveyer supporting frame is turned to a vertical position, an auxiliary conveyer frame pivotally supported from the end of the first-named pivoted conveyer frame, and an endless conveyer operating thereover.

6. In a gathering machine of the character described, main supporting frames, a hay rack mounted upon the frame and including a vertically disposed back and a vertically disposed front, a conveyer supporting frame pivotally mounted upon the main frame at one end thereof at the level of the floor of the rack, an endless conveyer carried upon the main frame and the conveyer supporting frame and forming the front of the rack and one end of the rack when the pivoted conveyer supporting frame is turned to a vertical position, an auxiliary conveyer frame pivotally supported from the end of the first-named pivoted conveyer frame, an endless conveyer operating thereover, and means for operating the last-named endless conveyer from the first-named endless conveyer.

7. In a hay gathering machine of the character described, a main supporting frame, a hay rack mounted upon the frame and including a vertically disposed back and a vertically disposed front, a conveyer supporting frame pivotally mounted upon the main frame at one end thereof approximately at the level of the floor of the rack, endless conveyers carried upon the main frame and the conveyer supporting frames and forming the floor of the rack and opposite ends of the rack when the pivoted conveyer supporting frames are turned to a vertical position, means for driving the conveyers simultaneously in one direction or the other direction, and means for disconnecting the endless conveyers from the driving means.

8. In a hay gathering machine of the character described, a main supporting frame, a hay rack mounted upon the frame and including a vertically disposed back and a vertically disposed front, a conveyer supporting frame pivotally mounted upon the main frame at one end thereof approximately at the level of the floor of the rack, a conveyer supporting frame pivotally mounted upon the main frame at the other end thereof approximately at a level with the floor of the rack, endless conveyers mounted upon the main frame and the pivotally supported frames, means for driving said endless conveyers in one direction or the other, means for raising or lowering the pivoted conveyer supporting frames to close or open the ends of the rack, and means for disconnecting all of said conveyers from engagement with the driving means.

In testimony whereof I affix my signature in presence of two witnesses.

WALLACE G. GALLAHER. [L. S.]

Witnesses:
   C. S. KRAMER,
   C. D. FLOYD.